(12) United States Patent
Luan et al.

(10) Patent No.: US 11,231,899 B2
(45) Date of Patent: Jan. 25, 2022

(54) SCREEN-PROJECTION EMITTER, SCREEN-PROJECTION EMISSION SYSTEM AND SCREEN-PROJECTION SYSTEM

(71) Applicant: BOE TECHNOLOGY GROUP CO., LTD., Beijing (CN)

(72) Inventors: Kelong Luan, Beijing (CN); Xinyi Cheng, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/975,649

(22) PCT Filed: Feb. 19, 2020

(86) PCT No.: PCT/CN2020/075791
§ 371 (c)(1),
(2) Date: Aug. 25, 2020

(87) PCT Pub. No.: WO2020/215862
PCT Pub. Date: Oct. 29, 2020

(65) Prior Publication Data
US 2021/0011680 A1 Jan. 14, 2021

(30) Foreign Application Priority Data
Apr. 23, 2019 (CN) .......................... 201910330640.1

(51) Int. Cl.
*G06F 3/14* (2006.01)
*H04N 21/41* (2011.01)
*H04N 21/4363* (2011.01)

(52) U.S. Cl.
CPC ....... *G06F 3/1454* (2013.01); *H04N 21/4122* (2013.01); *H04N 21/43637* (2013.01)

(58) Field of Classification Search
CPC ..... G06F 3/1454; G06F 3/14; H04N 21/4122; H04N 21/43637; G09G 2370/16; H04B 1/04; H04B 1/40
See application file for complete search history.

(56) References Cited

U.S. PATENT DOCUMENTS 10,491,760 B1 * 11/2019 Lin ......................... G06F 13/40
2005/0106941 A1 * 5/2005 Witchey .................. H04L 29/06
439/620.09

(Continued)

FOREIGN PATENT DOCUMENTS

CN 101909366 A 12/2010
CN 106303314 A 1/2017
(Continued)

*Primary Examiner* — Fernando Alcon
(74) *Attorney, Agent, or Firm* — The Webb Law Firm

(57) ABSTRACT

The present disclosure relates to a screen-projection emitter, a screen-projection emission system and a screen-projection system. The screen-projection emitter includes a memory which is configured to store screen-projection data processing software instruction set. The computer device is configured to receive the screen-projection data processing software instruction set from the memory, run the screen-projection data processing software instruction set locally to process data of content to be projected, and provide the processed data of content to be projected to the screen-projection emitter.

13 Claims, 2 Drawing Sheets

(56) References Cited

U.S. PATENT DOCUMENTS

| | | | |
|---|---|---|---|
| 2009/0146965 A1* | 6/2009 | Hildebrandt | G06Q 10/10 345/173 |
| 2010/0138780 A1* | 6/2010 | Marano | G06F 3/147 715/804 |
| 2010/0309896 A1 | 12/2010 | Sugiyama et al. | |
| 2012/0257105 A1* | 10/2012 | Kimoto | G09G 5/006 348/441 |
| 2014/0154994 A1* | 6/2014 | Mason | H04N 21/43635 455/66.1 |
| 2014/0365611 A1 | 12/2014 | Praveenkumar et al. | |
| 2015/0082241 A1* | 3/2015 | Kang | H04N 7/15 715/803 |
| 2016/0239232 A1* | 8/2016 | Chang | G06F 3/0622 |
| 2019/0354356 A1* | 11/2019 | Watanabe | G06F 3/1454 |
| 2020/0195697 A1 | 6/2020 | Jiang et al. | |
| 2020/0374581 A1* | 11/2020 | Tonnoir | H04N 21/4183 |
| 2021/0011680 A1 | 1/2021 | Luan et al. | |

FOREIGN PATENT DOCUMENTS

| | | |
|---|---|---|
| CN | 106412683 A | 2/2017 |
| CN | 109348167 A | 2/2019 |
| CN | 110022161 A | 7/2019 |

* cited by examiner

SCREEN-PROJECTION EMITTER, SCREEN-PROJECTION EMISSION SYSTEM AND SCREEN-PROJECTION SYSTEM

CROSS-REFERENCE TO RELATED APPLICATIONS

This application is the United States national phase of International Application No. PCT/CN2020/075791 filed Feb. 19, 2020, and claims priority to Chinese Patent Application No. 201910330640.1 filed Apr. 23, 2019, the disclosures of which are hereby incorporated by reference in their entirety.

TECHNICAL FIELD

The present disclosure relates to a technical field of wireless screen-projection, especially to a screen-projection emitter, a screen-projection emission system and a screen-projection system.

BACKGROUND

In a field of wireless screen-projection office, a problem in which interfaces of an office computer do not match a display device often occurs in a conference, the display device is probably provided with either a VGA interface or an HDMI interfaces in advance, but the office computer often does not have a corresponding interface.

At present, a mass resource CPU is provided within a screen-projection emitter in a main wireless screen-projection transmission device on the market, the mass resource CPU is used to process screen-projection content, but the execution efficiency of the CPU within the screen-projection emitter is relatively low, thereby this leads to low work efficiency of the screen-projection emitter, further influences a speed at which the screen-projection content is transmitted to a receiver, so that the transmission speed is low. And the design of the mass resource CPU is complex, the production cost thereof is comparatively high.

SUMMARY

According to one aspect the present disclosure, there is provided a screen-projection emission system comprising a screen-projection emitter and a computer device which is detachablely connected with the screen-projection emitter. The screen-projection emitter includes a memory which is configured to store a screen-projection data processing software instruction set. The computer device is configured to receive the screen-projection data processing software instruction set from the memory, run the screen-projection data processing software instruction set locally to process data of content to be projected, and provide the processed data of content to be projected to the screen-projection emitter.

In some embodiments, the screen-projection emitter further includes: an MCU controller which is configured to transmit the screen-projection data processing software instruction set stored in the memory to the computer device.

In some embodiments, the screen-projection emitter further includes a WiFi radio frequency emitter, the MCU controller is further configured to: receive the processed data of content to be projected from the computer device; and by way of the WiFi radio frequency emitter, transmit the processed data of content to be projected to a receiver, wherein the screen-projection emitter is connected with the receiver by way of a point to point WiFi link.

In some embodiments, the screen-projection emitter further includes a button, the MCU controller is further configured to: in response to detecting a first operation on the button by a user, recognize a link disconnecting indication, and transmit the link disconnecting indication to the computer device; or in response to detecting a second operation on the button by the user, recognize a link establishing indication, and transmit the link establishing indication to the computer device. Wherein, the first operation is an operation for indicating disconnecting the link, the second operation is an operation for indicating establishing the link.

In some embodiments, the screen-projection emitter further includes an LED lamp indicator, the MCU controller is further configured to: in response to receiving a link disconnecting response to the link disconnecting indication from the computer device, cause the LED lamp indicator to be in a first state; or in response to receiving a link establishing response to the link establishing indication from the computer device, cause the LED lamp indicator to be in a second state.

In some embodiments, the MCU controller is further configured to: in response to receiving the link disconnecting response to the link disconnecting indication from the computer device, stop transmitting the processed data of content to be projected to the receiver by way of the point to point WiFi link; or in response to receiving the link establishing response to the link establishing indication from the computer device, start transmitting the processed data of content to be projected to the receiver by way of the point to point WiFi link.

In some embodiments, the computer device is further configured to: in response to receiving the link disconnecting indication, cause the point to point WiFi link to be disconnected, and transmit the link disconnecting response which indicates that the point to point WiFi link has been disconnected to the MCU controller; or in response to receiving the link establishing indication, cause the point to point WiFi link to be established, and transmit the link establishing response which indicates that the point to point WiFi link has been established to the MCU controller.

In some embodiments, the computer device and the screen-projection emitter are connected by way of a USB interface.

In some embodiments, the screen-projection emitter further includes a USB hub which is configured to be connected with the computer device, the MCU controller and the WiFi radio frequency emitter.

In some embodiments, the screen-projection data processing software instruction set includes one or more of the following: an audio/video acquisition instruction set, an audio/video encoding instruction set, a WiFi protocol stack instruction set or a control information interaction instruction set.

According to another aspect of the present disclosure, there is provided a screen-projection emitter which is detachablely connected with a computer device, the screen-projection emitter comprises: a memory, a WiFi radio frequency emitter and an MCU controller. The memory is configured to store a screen-projection data processing software instruction set. The screen-projection data processing software instruction set include an audio/video acquisition instruction set, an audio/video encoding instruction set and a WiFi protocol stack instruction set. The MCU controller is configured to: transmit the screen-projection data processing software instruction set stored in the memory to the computer device so that it is run by the computer device locally to process data of content to be projected, wherein, the screen-projection data processing software instruction set is not run in the screen-projection emitter; receive the processed data of content to be projected from the computer device; and by way of the WiFi radio frequency emitter, transmit the processed data of content to be projected to a receiver, wherein the screen-projection emitter is connected with the receiver by way of a point to point WiFi link.

In some embodiments, the screen-projection emitter further includes a button, wherein the MCU controller is further configured to: in response to detecting a first operation on the button by a user, recognize a link disconnecting indication, and transmit the link disconnecting indication to the computer device; or in response to detecting a second operation on the button by the user, recognize a link establishing indication, and transmit the link establishing indication to the computer device. The first operation is an operation for indicating disconnecting the link, the second operation is an operation for indicating establishing the link.

In some embodiments, the screen-projection emitter further includes an LED lamp indicator. The MCU controller is further configured to: in response to receiving a link disconnecting response to the link disconnecting indication from the computer device, cause the LED lamp indicator to be in a first state; or in response to receiving a link establishing response to the link establishing indication from the computer device, cause the LED lamp indicator to be in a second state.

In some embodiments, the MCU controller is further configured to: in response to receiving the link disconnecting response to the link disconnecting indication from the computer device, stop transmitting the processed data of content to be projected to the receiver by way of the point to point WiFi link; or in response to receiving the link establishing response to the link establishing indication from the computer device, start transmitting the processed data of content to be projected to the receiver by way of the point to point WiFi link.

In some embodiments, the link disconnecting response indicates that the point to point WiFi link has been disconnected, the link establishing response indicates that the point to point WiFi link has been established.

In some embodiments, the screen-projection emitter further includes a USB hub which is configured to be connected with the computer device, that the MCU controller and the WiFi radio frequency emitter.

In some embodiments, the screen-projection data processing software instruction set includes one or more of the following: an audio/video acquisition instruction set, an audio/video encoding instruction set, a WiFi protocol stack instruction set or a control information interaction instruction set.

According to another aspect of the present disclosure, there is provided a screen-projection system comprising: one or more screen-projection emitters as described above; and a receiver which is detachable connected with a display to present the received processed data of content to be projected as screen-projection content.

In some embodiments, the receiver is configured to: in response to a first screen-projection emitter disconnecting a first point to point WiFi link with the receiver, establish a second point to point WiFi link with a second screen-projection emitter.

DETAILED DESCRIPTION

Figure 1:
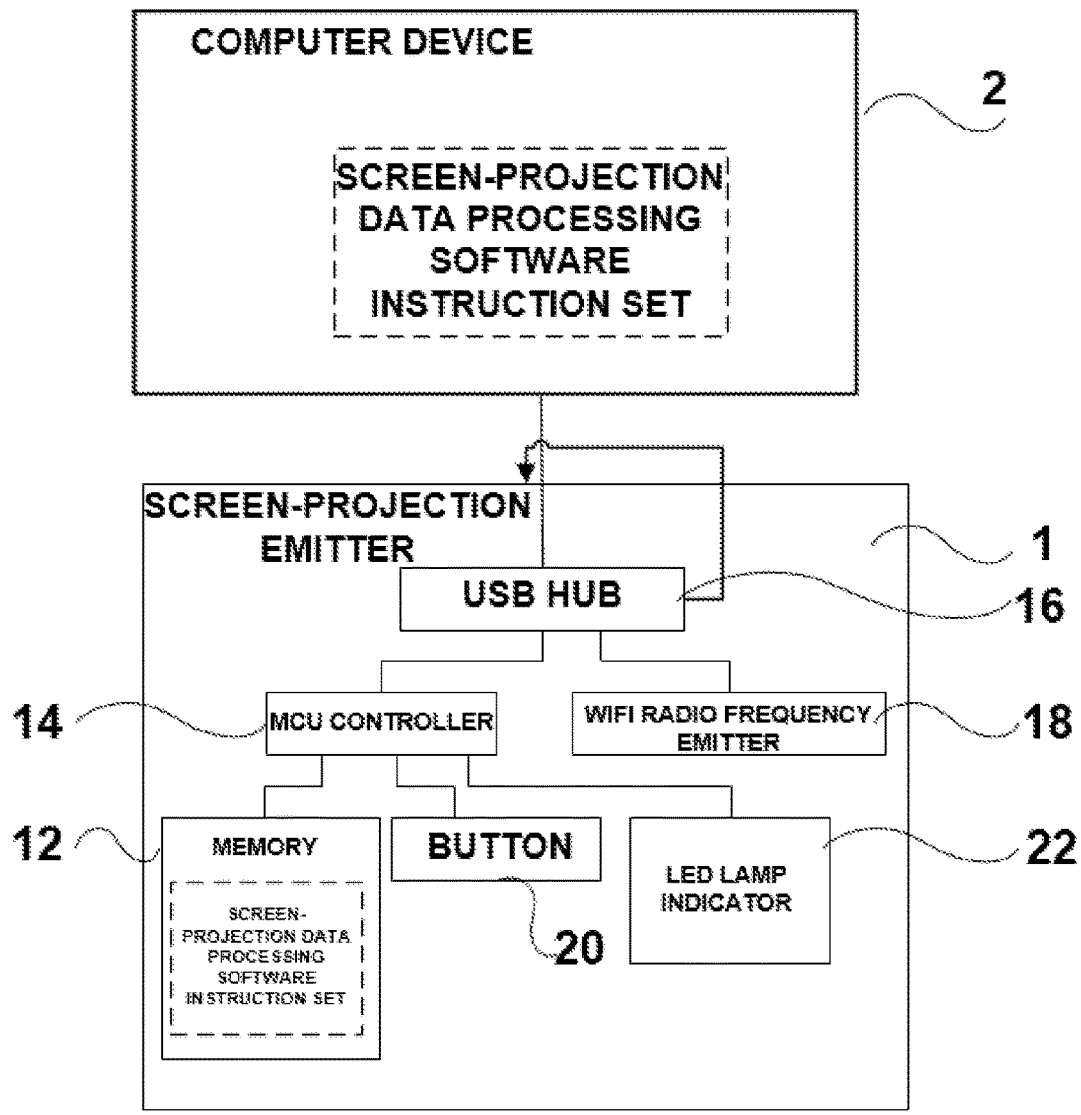
FIG. 1 is a schematic view of a screen-projection emission system provided by an embodiment of the present disclosure.

In order to further set forth technical means adopted by the present disclosure for achieving a predetermine goal and effects, hereinafter in conjunction with drawings and better embodiments, specific embodiments, structures, features and effects of a screen-projection emitter and a transmission device proposed in accordance with the present disclosure are explained in detail as follows.

Embodiments of the present disclosure propose a screen-projection emitter, a screen-projection emission system and a wireless system. The screen-projection emission system may include a screen-projection emitter and a computer device which is detachably connected with the screen-projection emitter (e.g., by way of a USB interface). The screen-projection emitter includes a memory which is configured to store a screen-projection data processing software instruction set. The screen-projection data processing software instruction set may include one or more of the following: an audio/video acquisition instruction set, an audio/video encoding instruction set, a WiFi protocol stack instruction set or a control information interaction instruction set. The computer device may be configured to receive the screen-projection data processing software instruction set from the memory, run the screen-projection data processing software instruction set locally to process data of content to be projected, and provide the processed data of content to be projected to the screen-projection emitter. According to an embodiment of the present disclosure, the screen-projection emitter stores a screen-projection data processing software (i.e., an instruction set), but does not run the software, it provides the software to the computer device (e.g., a notebook computer) which is connected with the screen-projection emitter, the software is run by a processor (e.g., CPU) of the computer device. The processing efficiency of the processor in the computer device is generally higher than the operating efficiency of a controller within the screen-projection emitter, the screen-projection emitter is only used as a carrier of the software, the processing capacity of the computer device is used as an operating subject of the software, such that the screen-projection emitter may not have to have a complex processor (e.g., CPU), this can save the manufacturing cost of the screen-projection emitter. In addition, acquisition and encoding of audio/video, the WiFi protocol stack instruction set (e.g., WiFi driver) etc., run in the computer device, the speed is higher, the latency is small, better user experience may be provided. In some embodiments, the screen-projection emitter further includes an MCU controller, the MCU controller is used as a main control unit in the screen-projection emitter, and since the complex high-load software running is transferred to the computer device, the load of the MCU controller is small, the processing capacity requirement is not high, the manufacturing cost of the screen-projection emitter may also be reduced.

An embodiment of the present disclosure also provides a screen-projection system which includes the screen-projection emitter and a receiver, a point to point wireless connection may be between the screen-projection emitter and the receiver. The screen-projection emitter, for example, may have a USB interface, so that it can almost be connected with USB interfaces of most computer devices, e.g., a desktop computer or a notebook computer. The receiver may have an HDMI interface, so as to be connected with an HDMI interface of a display. When screen-projection is performed, data of content to be projected may be provided to the screen-projection emitter by the computer device, be wirelessly transmitted to the receiver, be provided to the display by the receiver, to be displayed on the display, thereby the screen-projection is completed.

The above mentioned explanation is only an overview of technical solutions of the present disclosure, and in order to be able to understand technical means of the present disclosure more clearly so that they may be practiced according to content of the specification, and in order to let the above mentioned and other objects, features and advantages of the present disclosure be able to be more obvious and easy to understand, hereinafter specific embodiments of the present disclosure are given.

Figure 2:
FIG. 2 is a schematic view of a screen-projection system provided by an embodiment of the present disclosure.

As shown in FIG. 1 and FIG. 2, an embodiment of the present disclosure provides a screen-projection emission system, which includes a screen-projection emitter 1 and a computer device 2. The screen-projection emitter 1 and the computer device 2 are connected together, e.g. by way of a USB interface. Since almost any computer device is provided with the USB interface, the use of the USB interface by the screen-projection emitter to connect with the computer device provides wide compatibility.

As shown in the Figures, the screen-projection emitter 1 includes a memory 12, which stores a screen-projection data processing software instruction set. In the present application, the screen-projection data processing software instruction set refers to a set of instructions which can execute screen-projection data processing functions and which is implemented with an arbitrary computer program language, the screen-projection data processing software instruction set may include multiple instruction sets which execute different functions respectively. In some embodiments, the screen-projection data processing software instruction set include one or more of the following: an audio/video acquisition instruction set, an audio/video encoding instruction set, a WiFi protocol stack instruction set or a control information interaction instruction set. The audio/video acquisition instruction set is used to acquire content to be projected (which includes audio and/or video), the audio/video encoding instruction set is used to encode data of the acquired content to be projected to improve transmission efficiency, the WiFi protocol stack instruction set is used to process the encoded data according to a WiFi protocol stack, to comply with requirements of WiFi transmission. The control information interaction instruction set is used to control interaction of control information between the computer device 2 and the screen-projection emitter 1.

The term "memory", for example, includes: CD-ROM, a floppy disk 104 or a magnetic tape apparatus; a computer system memory or a random access memory, such as DRAM, DDR RAM, SRAM, EDO RAM, Rambus RAM etc; a nonvolatile memory, such as a Flash memory, a magnetic medium, e.g., a hard disk or an optical storage device; a register, or other similar types of memory elements, etc.

As shown in the Figures, the screen-projection emitter 1 further includes a WiFi radio frequency emitter 18 and an MCU controller 14. The MCU (Microcontroller Unit) controller 14 is configured to transmit the screen-projection data processing software instruction set stored in the memory 12 to the computer device 2 so that it is run by the computer device 2 locally to process the data of content to be projected, wherein, the screen-projection data processing software instruction set is not run in the screen-projection emitter 1. The MCU controller 14 receives the processed data of content to be projected from the computer device 2, and by way of the WiFi radio frequency emitter 18, transmits the processed data of content to be projected to a receiver, wherein the screen-projection emitter 1 is connected with the receiver by way of a point to point WiFi link. The receiver is connected with a display on which screen-projection display is performed, e.g., by way of an HDMI interface or other interfaces.

In some embodiments, the computer device accesses a wireless local area network by way of a WiFi connection, a separate point to point WiFi link is additionally established between the screen-projection emitter and the receiver, therefore, transmission of the screen-projection data is not via the wireless local area network, does not occupy the network bandwith of the computer device. In order to establish the separate point to point WiFi link between the screen-projection emitter and the receiver, it is possible to, in initial settings of the screen-projection emitter and the receiver, set WiFi connection related information, e.g., a WiFi name and an IP address, etc.

An example of the computer device 2 may include a mobile phone or a smartphone (e.g., iPhone™, a phone based on Android™), a portable game apparatus (e.g., Nintendo DS™, PlayStation Portable™, Gameboy Advance™, iPhone™), a wearable electronic device such as a smart watch and/or smart glasses (e.g., Apple Watch™, Google Glass™), a laptop computer, PDA, a portable Internet device, a music player, a data storage device, or other handheld devices, etc.

The content to be projected is, e.g., audio/video content on the computer device which is expected to be projected on a projection device (e.g. a display), these content is subjected to the audio/video acquisition and encoding processes as well as the WiFi protocol stack process and becomes data which facilitates WiFi transmission and screen-projection operations. The processed data may be in a format which facilitates screen-projection in the receiver.

In some embodiments, the screen-projection emitter may also include a button 20. The MCU controller 14 may also be configured to, in response to detecting a first operation on the button 20 by a user (e.g., pressing the button when the link is in a connection state), recognize a link disconnecting indication, and transmit the link disconnecting indication to the computer device. The MCU controller may also be configured to, in response to detecting a second operation on the button 20 by the user (e.g., pressing the button again when the link is in a disconnection state), recognize a link establishing indication, and transmit the link establishing indication to the computer device. The first operation is an operation for indicating disconnecting the link. The second operation is an operation for indicating establishing the link. The first operation may also be long-pressing the button 20, the second operation may be continuously pressing the button twice. The settings of the first operation and the second operation may be different. And the button may adopt various structures, not only may be a press type, but also may be a toggle switch, may also be a touch control button, etc.

In some embodiments, the screen-projection emitter may also include an LED lamp indicator 22. The MCU controller 14 may also be configured to, in response to receiving a link disconnecting response to the link disconnecting indication from the computer device 2, cause the LED lamp indicator 22 to be in a first state. The first state is for example that the LED lamp indicator flickers. The link disconnecting response to the link disconnecting indication received from the computer device 2 for example indicates that, under the control of the computer device 2, the above mentioned point to point WiFi link between the screen-projection emitter 1 and the receiver has already been disconnected.

The MCU controller may also be configured to, in response to receiving a link establishing response to the link establishing indication from the computer device 2, cause the LED lamp indicator to be in a second state. The second state is for example that the LED lamp indicator is always-on. The link establishing response to the link establishing indication received from the computer device 2 for example indicates that, under the control of the computer device, the above mentioned point to point WiFi link between the screen-projection emitter 1 and the receiver has been established.

In some embodiments, the computer device 2 may be configured to: in response to receiving the link disconnecting indication, cause the point to point WiFi link to be disconnected, and transmit the link disconnecting response which indicates that the point to point WiFi link has been disconnected to the MCU controller; or in response to receiving the link establishing indication, cause the point to point WiFi link to be established, and transmit the link establishing response which indicates that the point to point WiFi link has been established to the MCU controller.

In some embodiments, the MCU controller 14 may also be configured to, in response to receiving the link disconnecting response to the link disconnecting indication from the computer device 2, stop transmitting the processed data of content to be projected to the receiver by way of the point to point WiFi link. The MCU controller 14 may also be configured to, in response to receiving the link establishing response to the link establishing indication from the computer device 2, start transmitting the processed data of content to be projected to the receiver by way of the point to point WiFi link.

As shown in the Figures, the screen-projection emitter 1 may also include a USB hub 16. As shown in the Figures, the USB hub 16 is connected with the computer device 2, and is also connected with the MCU controller 14 and the WiFi radio frequency emitter 18 in the screen-projection emitter. FIG. 2 is a schematic view of a screen-projection system provided by an embodiment of the present disclosure. The screen-projection system includes a screen-projection emitter and a receiver which matches the screen-projection emitter. As shown in FIG. 2, the screen-projection emitter (e.g. the screen-projection emitter 1 in FIG. 1) is connected to a computer (e.g. the computer device 2 in FIG. 1), e.g., by way of a USB interface, the receiver is connected to a display device, e.g., by way of an HDMI interface, and between the screen-projection emitter and the receiver, communication is performed by way of a point to point WiFi link. When the screen-projection is performed, the screen-projection emitter transmits data of content to be projected to the receiver, the data is displayed at the receiver end by way of the display device.

Figure 3:
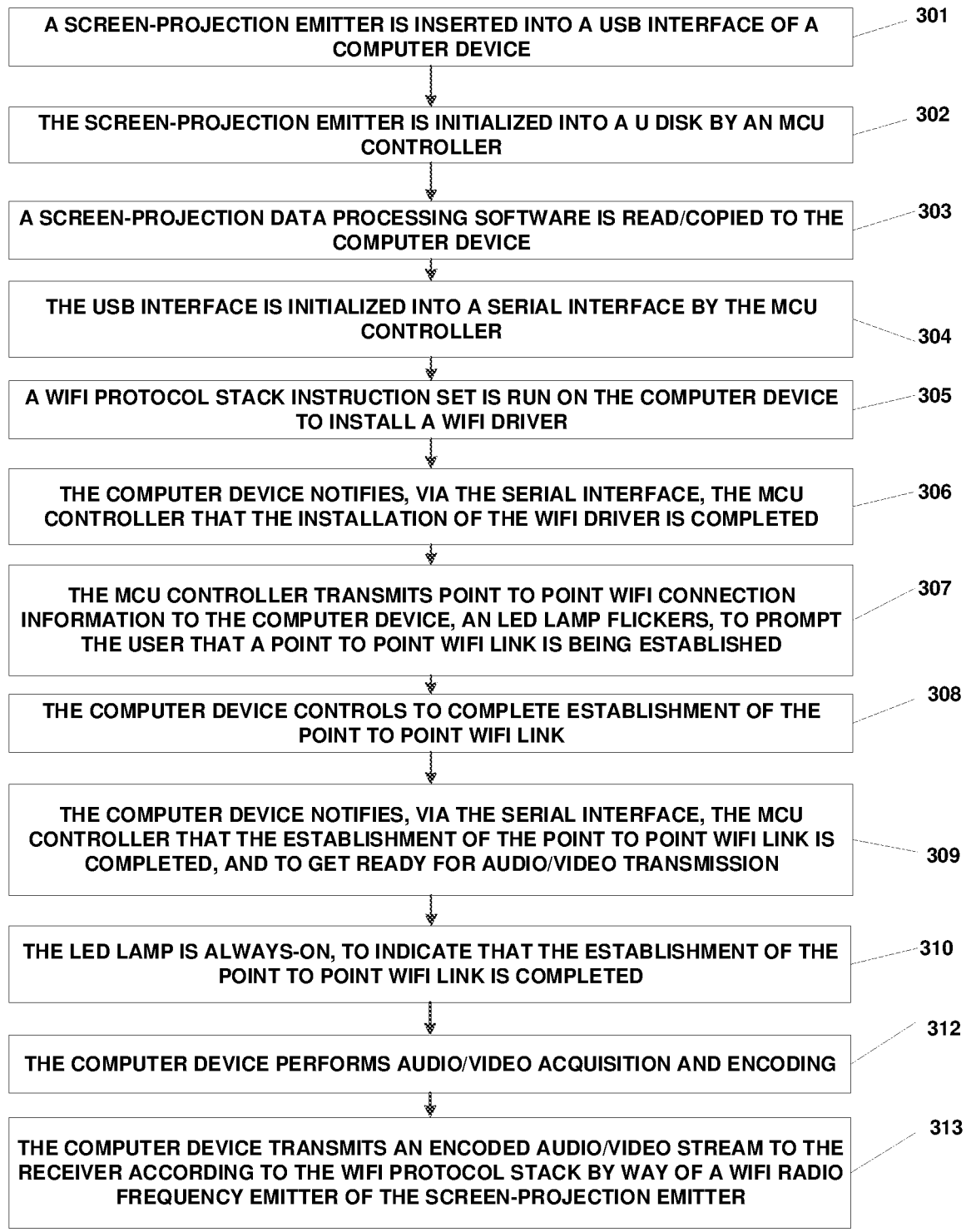
FIG. 3 is a flow chart of a screen-projection method provided by an embodiment of the present disclosure.

FIG. 3 is a flow chart of a screen-projection method provided by an embodiment of the present disclosure. As shown in FIG. 3, the method includes the following steps:

step 301: a screen-projection emitter is inserted into a USB interface of a computer device, and at this time, the screen-projection emitter is powered on.

step 302: the screen-projection emitter is initialized into a U disk by an MCU controller. I.e., at this time, the computer device 2 recognizes the screen-projection emitter as a U disk. The U disk stores a screen-projection data processing software instruction set.

step 303: the screen-projection data processing software is read/copied to the computer device 2. At this time, it is possible that a user manually copies the screen-projection data processing software to the computer device 2, it is also possible that the computer device 2 automatically reads the screen-projection data processing software in a case where the user permits this.

step 304: the USB interface is initialized into a serial interface by the MCU controller. After the screen-projection data processing software is read/copied to the computer device 2, the USB interface is initialized into the serial interface to facilitate transmission of various control information. In some embodiments, it is possible to connect two USB interfaces of the USB hub with two USB interfaces of the MCU controller 14, one USB interface of the MCU controller is used for the U disk, the other is used for the serial interface. In some other embodiments, the MCU controller 14 may power off the USB interface and restart it to be the serial interface.

step 305: a WiFi protocol stack instruction set is run on the computer device 2 to install a WiFi driver. The WiFi driver is installed on the computer device 2 instead of the screen-projection emitter, this may simplify the design of the screen-projection emitter as much as possible, simultaneously may also use the efficiency of the processor of the computer device 2, provide better user experience.

step 306: the computer device 2 notifies, via the serial interface, the MCU controller that the installation of the WiFi driver is completed.

step 307: the MCU controller transmits point to point WiFi connection information to the computer device, an LED lamp flickers, to prompt the user that a point to point WiFi link is being established. The point to point WiFi connection information is, e.g., preset or prestored information which is used for the screen-projection emitter and the receiver to search out each other after they are powered on, e.g., it includes a WiFi name and/or an IP address.

step 308: the computer device 2 controls to complete establishment of the point to point WiFi link.

step 309: the computer device notifies, via the serial interface, the MCU controller that the establishment of the point to point WiFi link is completed, and to get ready for audio/video transmission.

step 310: the screen-projection emitter receives the notification that the establishment of the point to point WiFi link is completed, the LED lamp is always-on, to prompt the user that the establishment of the point to point WiFi link is completed.

step 312: the computer device 2 performs audio/video acquisition and encoding.

step 313: the computer device transmits an encoded audio/video stream to the receiver according to the WiFi protocol stack by way of a WiFi video screen-projection emitter of the screen-projection emitter.

The receiver receives the audio/video stream, may decode it, and display it on a display.

In an embodiment of the present disclosure, since the acquisition and encoding of audio/video and even the WiFi protocol stack process are implemented by the computer device, it is possible to make full use of the processing capacity of the computer device, make the latency of the screen-projection display small, improve user experience. On the other hand, the screen-projection emitter does not have to use a complex controller, it is possible to simplify the design of the screen-projection emitter, reduce the production cost.

In an embodiment of the present disclosure, one receiver may correspond to multiple screen-projection emitters 1. Each of the screen-projection emitters 1 may establish a corresponding point to point WiFi link with the receiver. For example, it is assumed that currently a first screen-projection emitter is performing screen-projection operations with the receiver by way of a first point to point WiFi link, the user presses a button of the first screen-projection emitter to cause the first point to point WiFi link to be disconnected, and presses a button of a second screen-projection emitter to cause a second point to point WiFi link to be established between the receiver and the second screen-projection emitter. The above are only specific embodiments of the present disclosure, but the protection scope of the present disclosure is not limited thereto. Any changes or substitutions which may be easily conceived of by those skilled in the art within the technical scope disclosed by the present disclosure are to be covered within the protection scope of the present disclosure. Therefore, the protection scope of the present disclosure is based on the protection scope of claims.

What is claimed is:

1. A screen-projection emission system comprising:
a screen-projection emitter which includes:
a memory which is configured to store a screen-projection data processing software instruction set; and
a computer device detachably connected with the screen-projection emitter, which is configured to:
acquire the screen-projection data processing software instruction set from the memory,
run the screen-projection data processing software instruction set locally to process data of content to be projected, and
provide the processed data of content to be projected to the screen-projection emitter,
wherein the screen-projection emitter further includes a button, the MCU controller is further configured to:
in response to detecting a first operation on the button by a user, recognize a link disconnecting indication, and transmit the link disconnecting indication to the computer device, the first operation being an operation for indicating disconnecting the point to point WiFi link; or
in response to detecting a second operation on the button by the user, recognize a link establishing indication, and transmit the link establishing indication to the computer device, the second operation being an operation for indicating establishing the point to point WiFi link,
wherein the screen-projection emitter further includes an LED lamp indicator, the MCU controller is further configured to:
in response to receiving a link disconnecting response to the link disconnecting indication from the computer device, cause the LED lamp indicator to be in a first indication state; or
in response to receiving a link establishing response to the link establishing indication from the computer device, cause the LED lamp indicator to be in a second indication state;
the first indication state and the second indication state are different indication states,
wherein the MCU controller is further configured to:
in response to receiving a link disconnecting response to the link disconnecting indication from the computer device, stop transmitting the processed data of content to be projected to the screen-projection receiver by way of the point to point WiFi link; or
in response to receiving a link establishing response to the link establishing indication from the computer device, start transmitting the processed data of content to be projected to the screen-projection receiver by way of the point to point WiFi link.

2. The screen-projection emission system according to claim 1, wherein the screen-projection emitter further includes:
an MCU controller which is configured to transmit the screen-projection data processing software instruction set stored in the memory to the computer device.

3. The screen-projection emission system according to claim 2, wherein the screen-projection emitter further includes a WiFi radio frequency emitter, the MCU controller is further configured to:
receive the processed data of content to be projected from the computer device; and
by way of the WiFi radio frequency emitter, transmit the processed data of content to be projected to a screen-projection receiver, wherein the screen-projection emitter is connected with the screen-projection receiver by way of a point to point WiFi link.

4. The screen-projection emission system according to claim 1, wherein the computer device is further configured to:
in response to receiving the link disconnecting indication, cause the point to point WiFi link to be disconnected, and transmit a link disconnecting response, which indicates that the point to point WiFi link has been disconnected, to the MCU controller; or
in response to receiving the link establishing indication, cause the point to point WiFi link to be established, and transmit a link establishing response, which indicates that the point to point WiFi link has been established, to the MCU controller.

5. The screen-projection emission system according to claim 1, wherein the computer device and the screen-projection emitter are connected by way of a USB interface.

6. The screen-projection emission system according to claim 3, wherein the screen-projection emitter further includes a USB hub which is configured to be connected with the computer device, the MCU controller and the WiFi radio frequency emitter.

7. The screen-projection emission system according to claim 1, wherein the screen-projection data processing software instruction set includes one or more of the following: an audio/video acquisition instruction set, an audio/video encoding instruction set, a WiFi protocol stack instruction set or a control information interaction instruction set.

8. A screen-projection emitter which is detachably connected with a computer device, the screen-projection emitter comprising:
a memory which is configured to store a screen-projection data processing software instruction set;
a WiFi radio frequency emitter; and
an MCU controller which is configured to:
transmit the screen-projection data processing software instruction set stored in the memory to the computer device so that it is run by the computer device locally to process data of content to be projected, wherein, the screen-projection data processing software instruction set is not run in the screen-projection emitter,
receive the processed data of content to be projected from the computer device, and by way of the WiFi radio frequency emitter, transmit the processed data of content to be projected to a receiver, wherein the screen-projection emitter is connected with the receiver by way of a point to point WiFi link, wherein the screen-projection emitter further comprises a button, wherein the MCU controller is further configured to:

in response to detecting a first operation on the button by a user, recognize a link disconnecting indication, and transmit the link disconnecting indication to the computer device, the first operation being an operation for indicating disconnecting the point to point WiFi link; or in response to detecting a second operation on the button by the user, recognize a link establishing indication, and transmit the link establishing indication to the computer device, the second operation being an operation for indicating establishing the point to point WiFi link, wherein the screen-projection emitter further comprises an LED lamp indicator, the MCU controller is further configured to:

in response to receiving a link disconnecting response to the link disconnecting indication from the computer device, cause the LED lamp indicator to be in a first state; or in response to receiving a link establishing response to the link establishing indication from the computer device, cause the LED lamp indicator to be in a second state, wherein the MCU controller is further configured to:

in response to receiving a link disconnecting response to the link disconnecting indication front the computer device, stop transmitting the processed data of content to be projected to the receiver by way of the point to point WiFi link: or in response to receiving a link establishing response to the link establishing indication from the computer device, start transmitting the processed data of content to be projected to the receive by way of the point to point WiFi link.

9. The screen-projection emitter according to claim 8, wherein a link disconnecting response to the link disconnecting indication indicates that the point to point WiFi link has been disconnected, a link establishing response to the link disconnecting indication indicates that the point to point WiFi link has been established.

10. The screen-projection emitter according to claim 8, further comprising a USB hub which is configured to be connected with the computer device, the MCU controller and the WiFi radio frequency emitter.

11. The screen-projection emitter according to claim 8, wherein the screen-projection data processing software instruction set includes one or more of the following:

an audio/video acquisition instruction set, an audio/video encoding instruction set, a WiFi protocol stack instruction set or a control information interaction instruction set.

12. A screen-projection system comprising:
one or more screen-projection emitters according to claim 8; and
a receiver which is detachable connected with a display to present the received processed data of content to be projected as screen-projection content.

13. The screen-projection system according to claim 1, the receiver is configured to: in response to a first screen-projection emitter disconnecting a first point to point WiFi link with the receiver, establish a second point to point WiFi link with a second screen-projection emitter.

* * * * *

UNITED STATES PATENT AND TRADEMARK OFFICE
CERTIFICATE OF CORRECTION

PATENT NO. : 11,231,899 B2
APPLICATION NO. : 16/975649
DATED : January 25, 2022
INVENTOR(S) : Kelong Luan et al.

Page 1 of 1

It is certified that error appears in the above-identified patent and that said Letters Patent is hereby corrected as shown below:

In the Claims

Column 11, Line 31, Claim 8, delete "front" and insert -- from --

Column 11, Line 34, Claim 8, delete "link:" and insert -- link; --

Column 12, Line 4, Claim 8, delete "receive" and insert -- receiver --

Signed and Sealed this
Fifteenth Day of March, 2022

Drew Hirshfeld
*Performing the Functions and Duties of the
Under Secretary of Commerce for Intellectual Property and
Director of the United States Patent and Trademark Office*